(12) United States Patent
Wu (10) Patent No.: US 8,708,580 B2
(45) Date of Patent: Apr. 29, 2014

(54) CABLE ASSEMBLY HAVING MOVABLE OPTICAL MODULES

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 171 days.

(21) Appl. No.: 13/339,881

(22) Filed: Dec. 29, 2011

(65) Prior Publication Data

US 2012/0170897 A1  Jul. 5, 2012

(30) Foreign Application Priority Data

Dec. 29, 2010  (CN) .......................... 2010 2 0687815

(51) Int. Cl.
*G02B 6/36* (2006.01)
*G02B 6/00* (2006.01)

(52) U.S. Cl.
USPC ............................................ 385/93; 385/147

(58) Field of Classification Search
USPC ................ 385/88–95, 147; 439/607.58, 626, 439/607.01
See application file for complete search history.

(56) References Cited

U.S. PATENT DOCUMENTS 8,403,568 B2 *  3/2013  Wang et al. .................... 385/76
2010/0233907 A1  9/2010  Wu

* cited by examiner

*Primary Examiner* — Akm Enayet Ullah
(74) *Attorney, Agent, or Firm* — Wei Te Chung; Ming Chieh Chang (57) ABSTRACT

A cable assembly includes an insulative housing having a main portion, and a mating portion extending forwardly from the mating portion. An optical device is attached to the housing and has a pair of optical module movable accommodated in the mating portion along a front-to-back direction for optical transmitting. The optical modules each has a seat and a number of lenses supported by the seat. The pair of optical modules are adapted for connecting two corresponding connectors, respectively, and a combination of the pair of the optical modules is also adapted for connecting a single corresponding connector.

16 Claims, 9 Drawing Sheets

CABLE ASSEMBLY HAVING MOVABLE OPTICAL MODULES

FIELD OF THE INVENTION

The present invention generally relates to a cable assembly, and more particularly to a cable assembly adapted for optical transmitting.

DESCRIPTION OF PRIOR ART

Nowadays, an electrical device has become lower profile and multi-functional, and a cable assembly for the electrical device is also capable of high-speed transmitting, and reliably connection and easily detachable with its counterpart. Cable assemblies in accordance with USB, SATA, HDMI, SAS and DisplayPort protocol have been widely applied in different kinds of electronic devices. The aforementioned cable assemblies depend on metallic terminals and copper wires to achieve electrical signal transmitting. However, transmitting speed is limited via electrical signal transmitting. In other aspect, as transmitting speed increasing, a structure of the cable assembly becomes complex, and a total dimension of the cable assembly is increasing.

Hence, an improved cable assembly is highly desired to overcome the aforementioned problems.

SUMMARY OF THE INVENTION

According to one aspect of the present invention, a cable assembly, comprises: an insulative housing having a main portion, and a mating portion extending forwardly from the mating portion; an optical device received in the housing, the optical device having a pair of optical modules movable accommodated in the mating portion along a front-to-back direction for optical transmitting, said optical modules each having a seat and a number of lenses supported by the seat; and a cable connected to the lenses and extending backwardly beyond the housing, wherein the pair of optical modules are adapted for connecting two corresponding connectors, respectively, and a combination of the pair of the optical modules are adapted for connecting a single corresponding connector.

According to another aspect of the present invention, a cable assembly, comprises: an insulative housing defining an upper depression, and a lower depression spaced away from the upper depression, both of the upper and the lower depressions extending forwardly through the housing; a pair of optical modules respectively movably retained in the upper and the lower depressions in a mating direction of the cable assembly in condition that the pair of optical module are without interfering with each other, each of the pair the optical modules having a seat, at least one lens mounted into the seat, and at least one fiber coupled to the lens and extending backwardly beyond the housing; and a cable located behind the housing and connected to the fiber.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Figure 1:
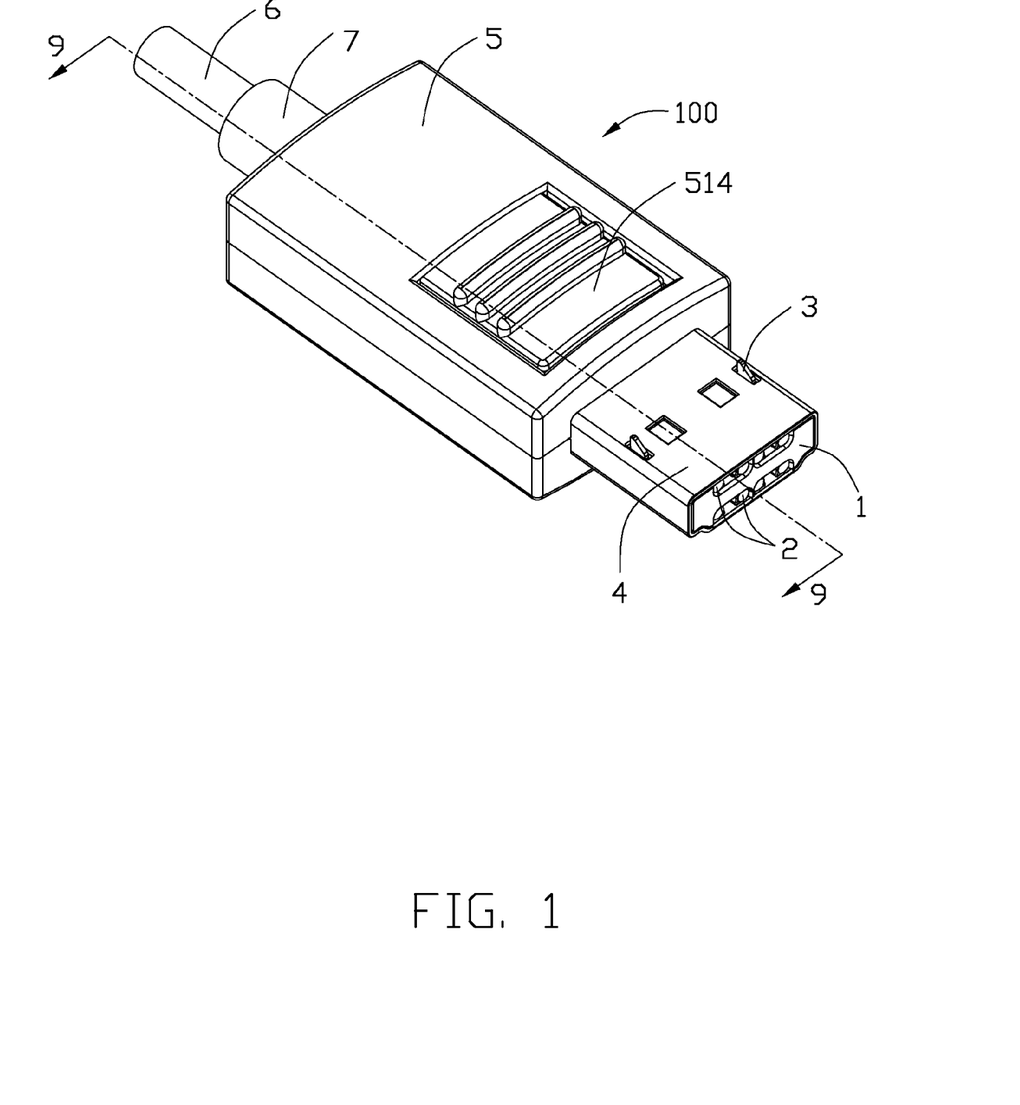
FIG. 1 is an assembled, perspective view of a cable assembly in accordance with the present invention.
Figure 2:
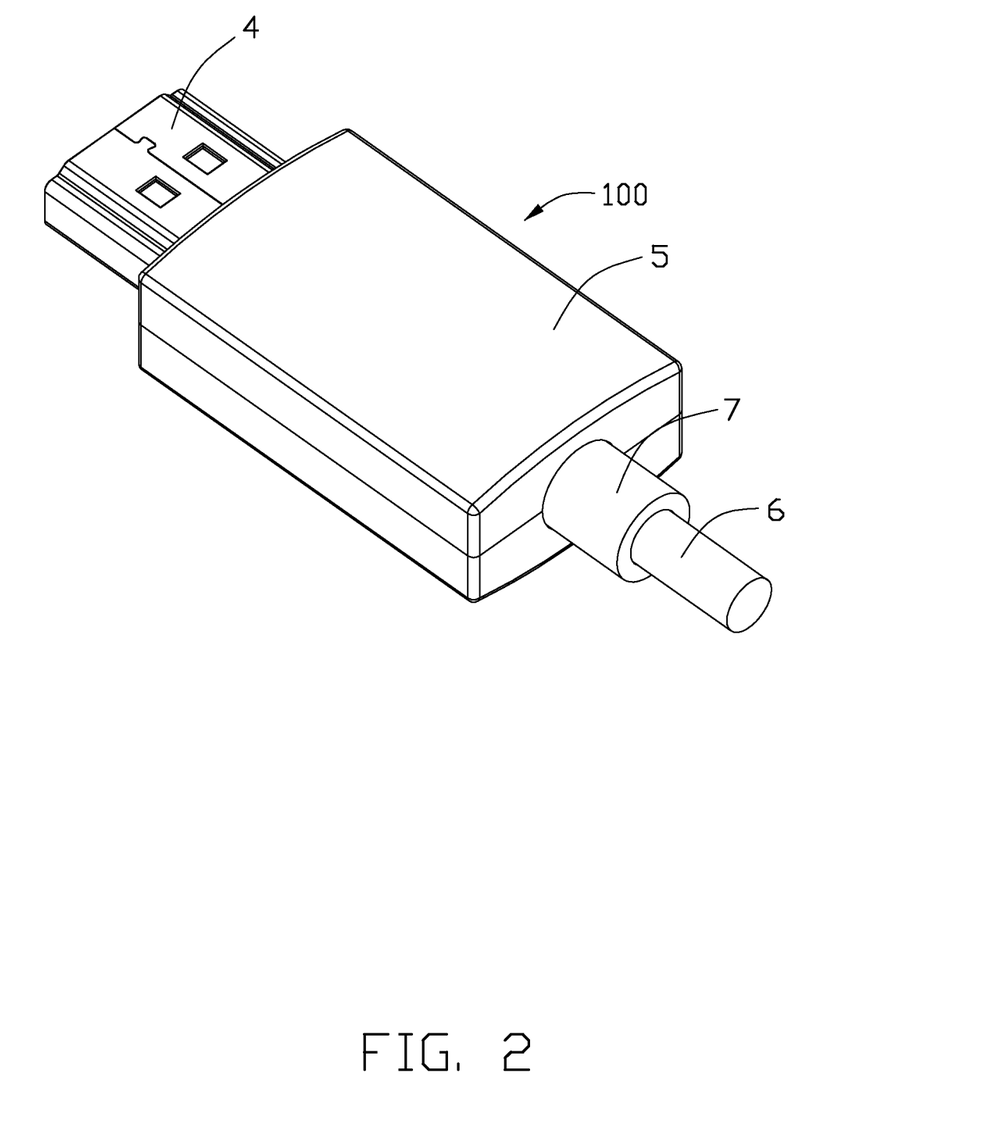
FIG. 2 is similar to FIG. 1, but viewed from another aspect.
Figure 3:
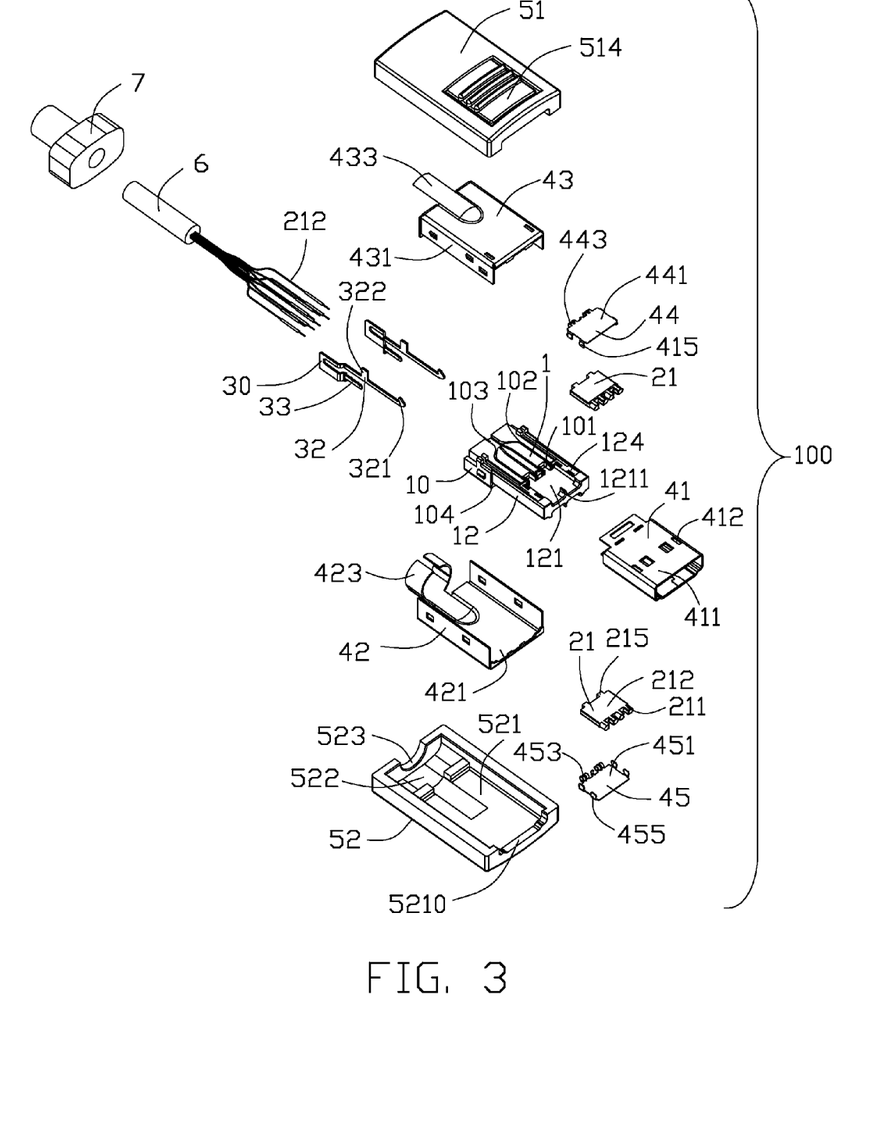
FIG. 3 is an exploded, perspective view of a cable assembly in accordance with the present invention.
Figure 4:
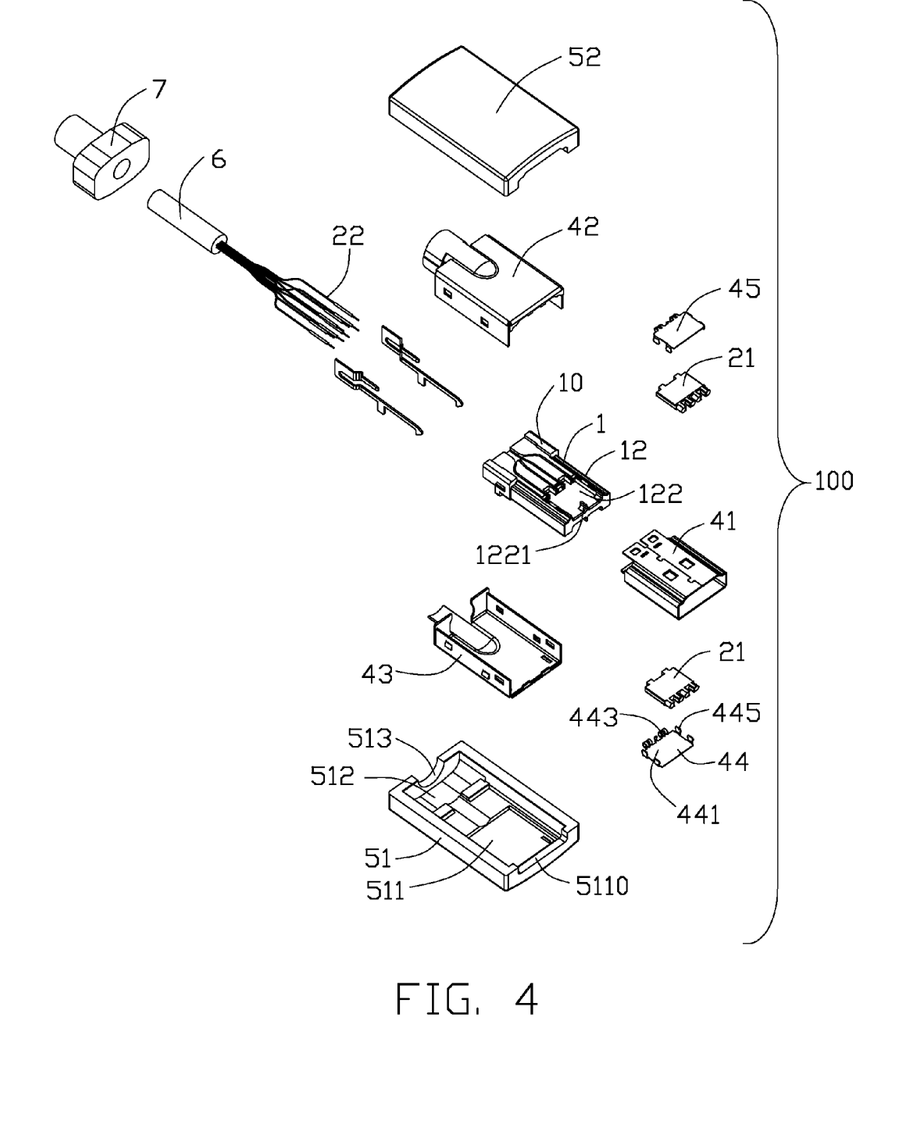
FIG. 4 is similar to FIG. 3, but viewed from a first aspect.
Figure 5:
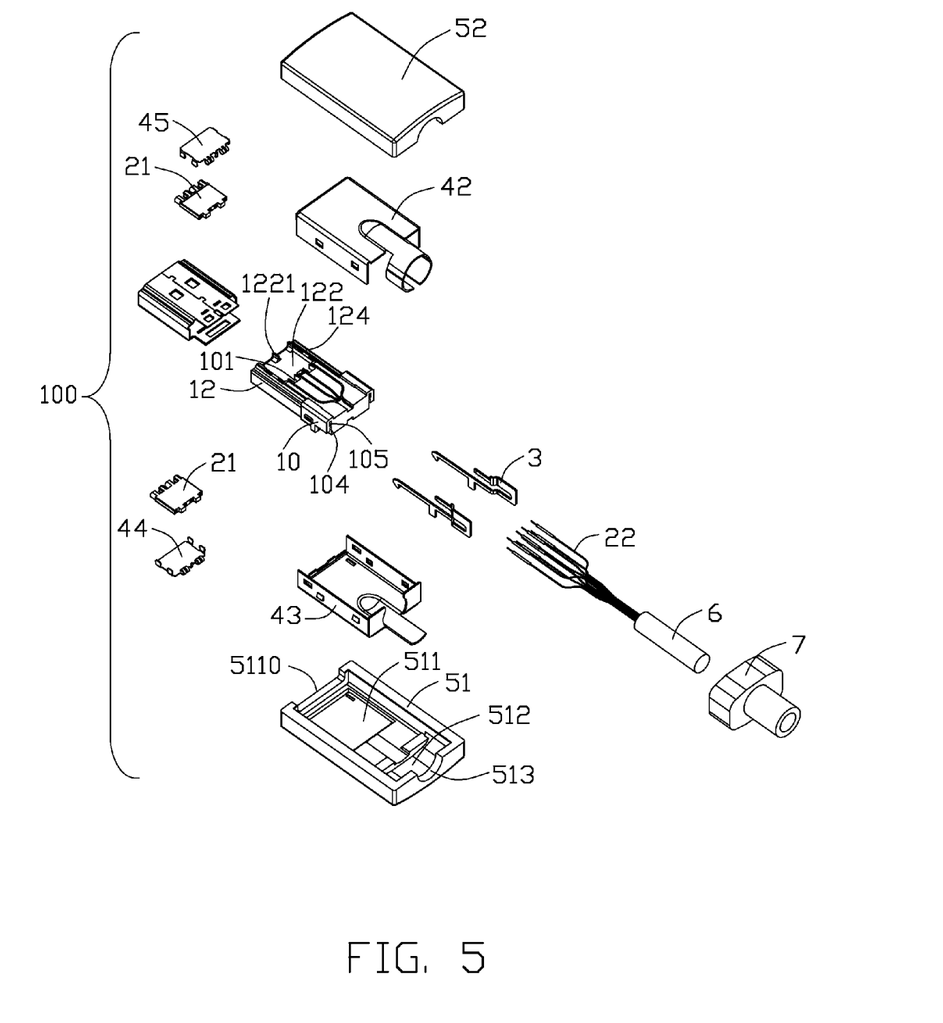
FIG. 5 is similar to FIG. 3, but viewed from a second aspect.
Figure 6:
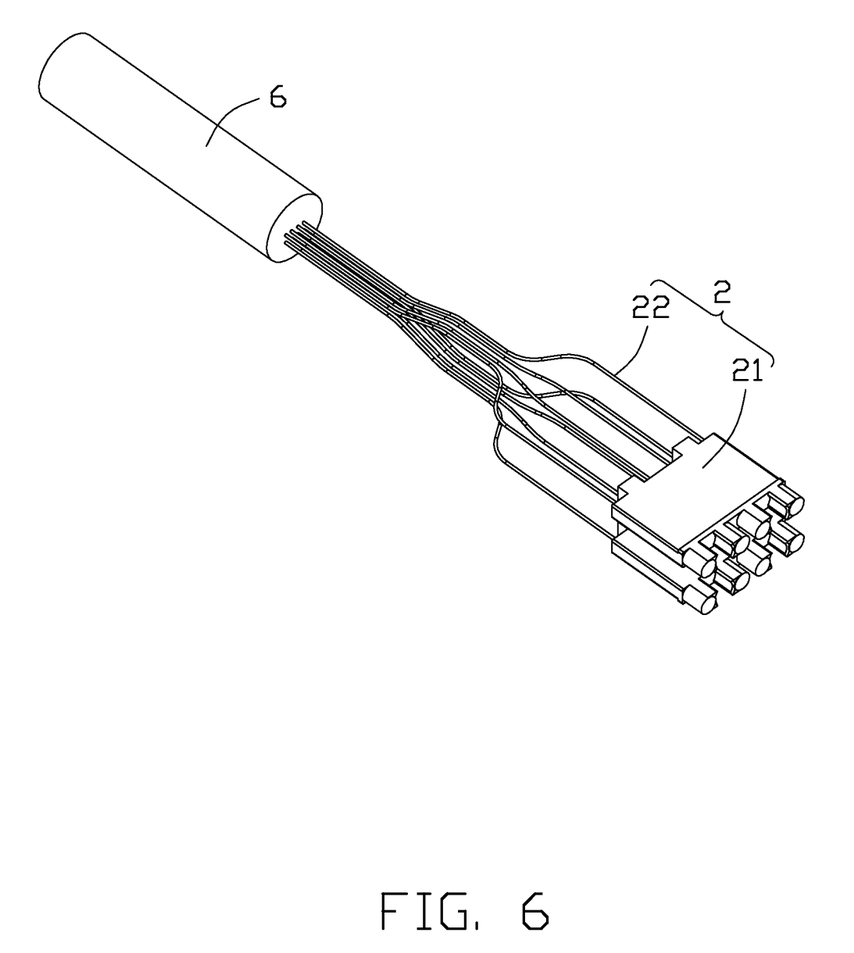
FIG. 6 is a partially assembled view of optical modules connecting with a cable of the cable assembly.
Figure 7:
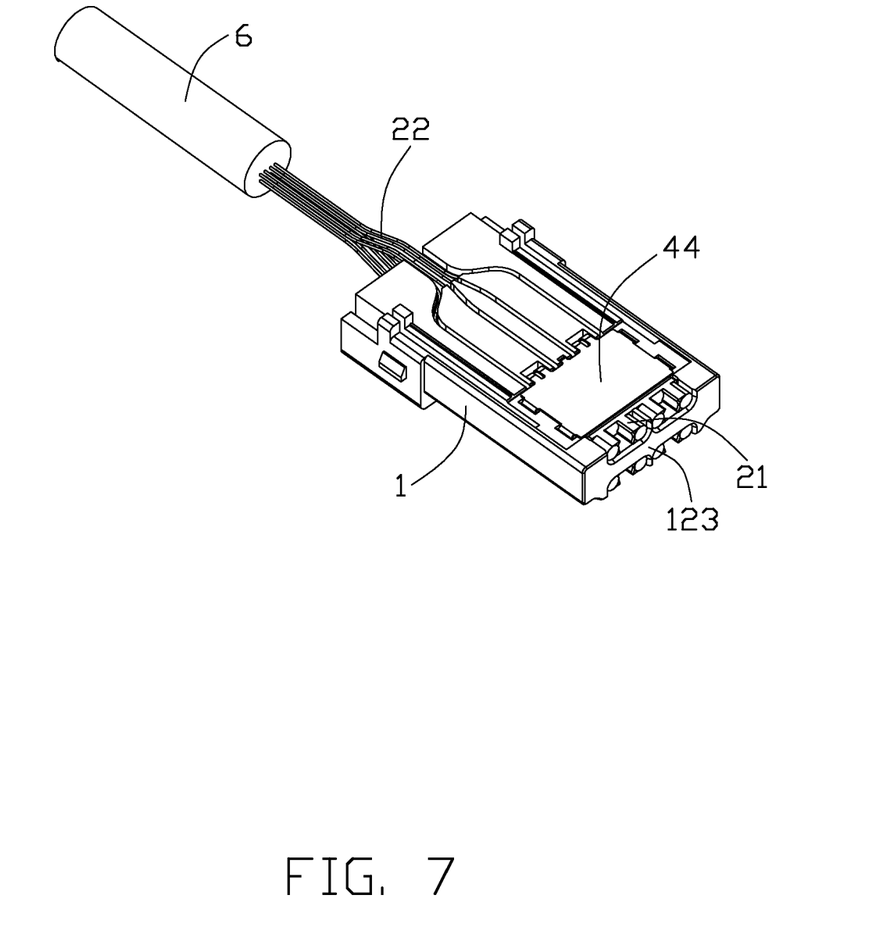
FIG. 7 is a partially assembled view of the optical modules accommodated in an insulative housing of the cable assembly.
Figure 8:
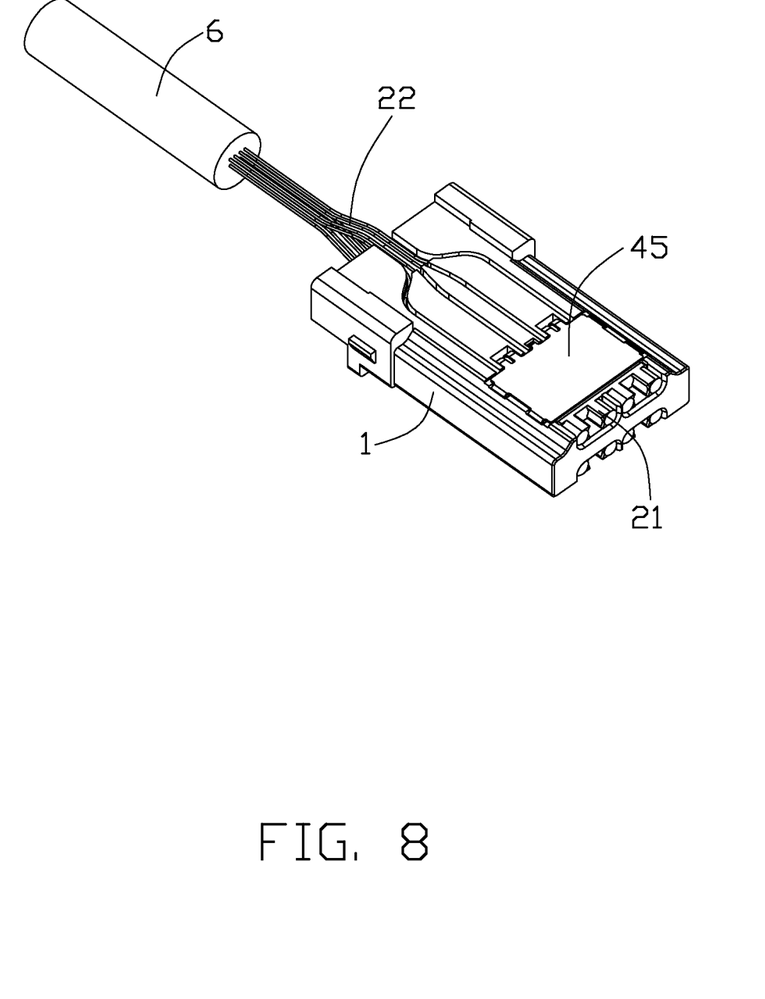
FIG. 8 is similar to FIG. 7, but viewed from other direction.
Figure 9:
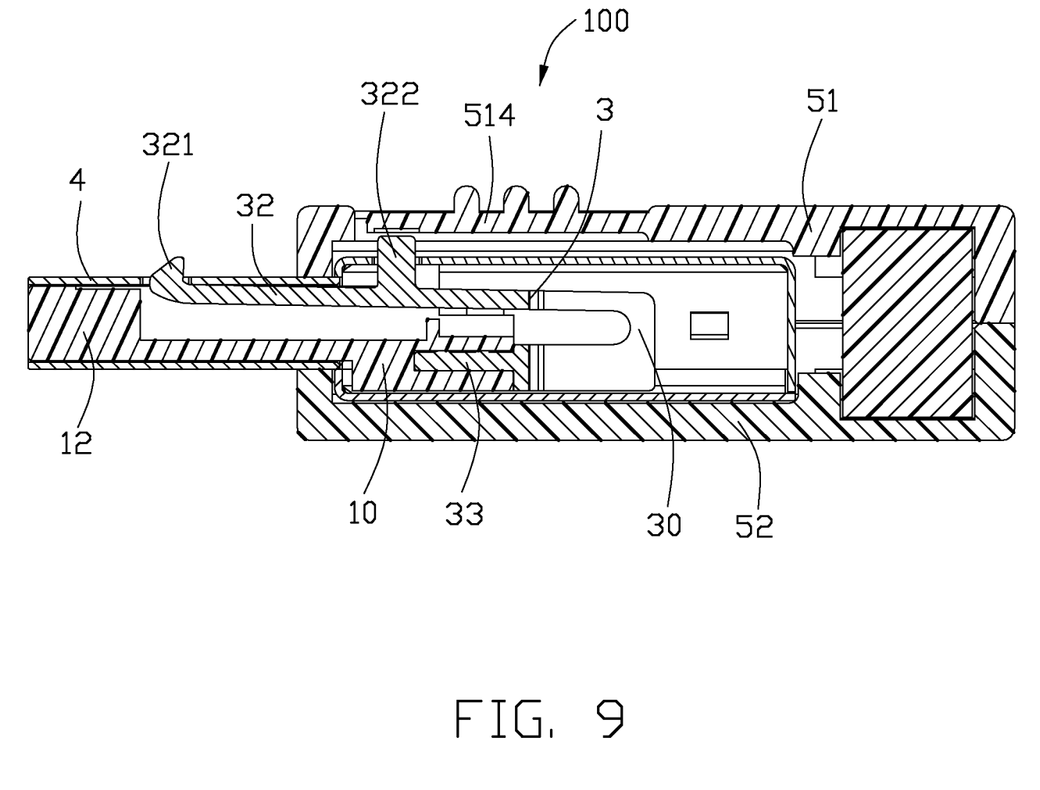
FIG. 9 is a cross-section view taken along line 9-9 of FIG. 1.

Referring to FIGS. 1-2, a cable assembly 100 in accordance with the present invention comprises an insulative housing 1, an optical device 2 movable retained in the housing 1 for optical transmitting, a pair of metallic latching members 3 retained in the housing 1, a metallic shell 4, an external cover 5, a cable 6, and a strain relief 7.

Referring to FIGS. 3-9, the insulative housing 1 includes a main portion 10 and a mating portion 12 extending forwardly from the main portion 10 for being inserted into a corresponding connector (not shown). The mating portion 12 has an upper depression 121 formed in a top surface, a lower depression 122 formed in a bottom surface, and a mating tongue 123 disposed between the upper and the lower depression 121, 122 along an upper-to-lower direction of the cable assembly 100. The upper depression 121 is configured with U-shaped viewed from a front side, and the lower depression 122 is configured with reverse U-shaped viewed from the front side. The upper and the lower depressions 121, 122 extend forwardly through the mating portion 12 respectively. The mating portion 12 further has a pair of supporting blocks 1211, 1221 disposed in front ends of the depressions 121, 122. A pair of side walls surround around the depressions 121, 122 and each has a securing slot 124. The main portion 10 has a pair of positioning slots 101 extending rearwardly from the upper depression 121, and another pair of positioning slots 101 extending rearwardly from the lower depression 122. A top and a bottom of the main portion 10 each has four channels 102 communicated with the depressions 121, 122, and a locating slot 103 extending rearwardly therethrough from the channels 102. The top of the main portion 10 has a pair of receiving slots 104 located two outside of the channels 102. A rear end of the main portion 10 has a retaining hole 105 disposed on two lateral sides thereof and under the receiving slots 104.

The optical device 2 includes a pair of optical modules 2 isolated away from each other in the upper-to-lower direction, a plurality of fibers 22 connecting the pair of optical modules 2 and the cables 6. Each of the pair of optical modules 2 includes a number of lenses 211 aligned along a transverse direction perpendicular to the upper-to-lower direction, and a plastic seat 212 supporting the lenses 211. The fibers 22 are respectively coupled to the lenses 211. In addition, the lenses 211 extend beyond front side of the seat 212, with a gap formed between front potions of every two adjacent lenses 211. The seat 212 has a pair of positioning posts 215 protruding rearwardly thereof.

Each of the latching members 3 includes a connecting arm 30, a latching arm 32 and a retention arm 33. The latching arm 32 and the retention arm 33 are spaced apart from each other in the upper-to-lower direction and extend forwardly from the connecting arm 30. The latching arm 32 and the retention arm 33 are located in a first vertical plane. The connecting arm 30 is of U-shaped and located in second vertical plane which is disposed outside the first vertical plane. The latching arm 32 has a hook 321 formed on a front end, a tab 322 formed on a top side thereof and disposed behind the hook 321. The hook 321 protrudes upwardly beyond the mating portion 12. The tab 322 protrudes upwardly beyond the main portion 10 for lathing with the corresponding connector. The retention arm 33 is inserted into the retaining hole 105 of the housing 1, and the latching arm 32 is retained in the receiving slot 104 of the housing 1.

The metallic shell 4 has a first shell 41, a second shell 42, a third shell 43, an upper cap 44, and a lower cap 45. The first shell 41 includes a frame 411 to accommodate the mating portion 12 therein. The second shell 42 includes a U-shaped main body 421 and a cable holder 423 integrated with the main body 421 and projecting backwardly. The third shell 43 includes an inverted U-shaped main portion 431 and a tail 433 extending rearwardly. The second shell 42 and the third shell 43 are combined together in the upper-to-lower direction.

The upper and the lower caps 44, 45 are symmetrical with each other in the upper-to-lower direction. The upper cap 44 includes a planar body 441 directly covering one optical module 21, a pair of cylindrical shaped first retainers 443 formed at a rear end thereof, and a plurality of second retainers 445 formed at opposite sides of the planar body 441. The lower cap 45 includes a planar body 451 directly covering the other optical module 21, a pair of cylindrical shaped first retainers 453 formed at a rear end thereof, and a plurality of second retainers 455 formed at opposite sides of the planar body 451.

The external cover 5 includes an upper cover 51 and a bottom cover 52. The upper cover 51 has a first hollow 511, a second hollow 512 disposed behind the first hollow 511, and a rectangular shaped opening 5110 located in a front portion thereof. The opening 5110 communicates with the first hollow 511. A semicircular shaped outlet 513 is defined in a rear portion of the upper cover 51 and communicated with the second hollow 512. A deformable button 514 is integrally formed with the upper cover 51 and floatable along the upper-to-lower direction to enter the first hollow 511 so as to actuate the tab 322 of the latching arm 32. When detach the cable assembly 100 from the corresponding connector, just press the deformable button 514 to actuate the tab 324 of the latching arm 32, and the latching arm 32 retreat into the receiving slots 104. When the pressing force is withdrawn, the deformable button 514 is restored to its original position, and the latching arms 32 also upwardly move by rebounded force.

The bottom cover 52 is similar to the upper cover 51, and also has a first hollow 521 and a second hollow 522 disposed behind the first hollow 521. An opening 5210 is located in a front portion of the bottom cover 52 and communicates with the first hollow 521. A semicircular shaped outlet 523 is defined in a rear portion of the bottom cover 52 and communicates with the second hollow 522.

The strain relief member 7 is molded over a front segment of the cable 6 and accommodated in the second hollows 512, 522.

The pair of optical modules 21 are assembled to the upper and the lower depressions 121, 122 of the insulative housing 1, respectively, and the lenses 211 are disposed to exterior for mating with the corresponding connector. the positioning posts 215 of the optical modules 21 are rearwardly received in the positioning slots 101 of the housing 1. The seats 212 of the optical modules 21 press onto the supporting block 1211, 1221 to be stopped by the supporting block 1211, 1221, respectively. The upper and the lower caps 44, 45 are assembled to the mating portion 12 of the housing 1 and covers the optical modules 21, respectively. The first retainers 443, 453 are received in the positioning slots 101 to be sandwiched between inner walls of the positioning slots 101 and the positioning posts 215 in a front-to-back direction for the optical modules 21 can move in the front-to-back direction. The second retainers 445, 455 are inserted in the securing slots 124 of the mating portion 12. The fibers 21 rearwardly pass through the channels 102 and the locating slots 103 in turn and connect with the cable 6. The pair of optical modules 21 could being adapted for connecting two corresponding connectors, respectively, and a combination of the pair of optical modules 21 could being adapted for connecting a single corresponding connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A cable assembly, comprising:
an insulative housing having a main portion, and a mating portion extending forwardly from the mating portion;
an optical device received the housing, the optical device having a pair of optical modules movable accommodated in the mating portion along a front-to-back direction for optical transmitting, said optical modules each having a seat and a number of lenses supported by the seat; and
a cable connected to the lenses and extending backwardly beyond the housing;
wherein the pair of optical modules are adapted for connecting two corresponding connectors, respectively, and a combination of the pair of the optical modules are adapted for connecting a single corresponding connector;
wherein the mating portion includes an upper depression, a lower depression opposited to the upper depression, and a mating tongue located between the upper and the lower depressions, the upper and the lower depressions extend forwardly through the mating portion, the pair of optical modules are capable of sliding along the upper and the lower depressions, respectively.

2. The cable assembly as recited in claim 1, wherein the lenses are arranged in a row along a transversal direction and embedded in the seat, the pair of optical modules are isolated away from each other by the housing.

3. The cable assembly as recited in claim 1, wherein the upper depression is configured with U-shaped from a front side, and the lower depression is configured with reverse U-shaped from the front side.

4. The cable assembly as recited in claim 1, further comprising a metallic upper cap and a metallic lower cap, both of which are retained on the mating portion to directly cover the optical modules, respectively.

5. The cable assembly as recited in claim 4, wherein the main portion has a plurality of positioning slots communicating with the upper and the lower depressions, and the optical modules include positioning posts backwardly received in the positioning slots, each of the upper and the lower caps has a planar body covers the optical module, and a cylindrical shaped first retainers sandwiched between the positioning post and an inner wall of the positioning slot.

6. The cable assembly as recited in claim 5, wherein the mating portion has a pair of supporting blocks disposed at front portions of the upper and the lower depressions, respectively, and the seat of the optical modules are stopped by the supporting block for being prevented from sliding away from the mating portion.

7. A cable assembly, comprising:
an insulative housing defining an upper depression, and a lower depression spaced away from the upper depression, both of the upper and the lower depressions extending forwardly through the housing;
a pair of optical modules respectively movably retained in the upper and the lower depressions in a mating direction of the cable assembly in condition that the pair of optical module are without interfering with each other, each of the pair the optical modules having a seat, at least one lens mounted into the seat, and at least one fiber coupled to the lens and extending backwardly beyond the housing; and
a cable located behind the housing and connected to the fiber;
further comprising a metallic upper cap and a metallic lower cap, both of which are retained on the mating portion to directly cover the optical modules, respectively;
wherein the housing includes a main portion, and a mating portion extending forwardly from the main portion and holding the pair of optical modules for being inserted into a corresponding connector, the upper and the lower caps are retained on the mating portion.

8. The cable assembly as recited in claim 7, wherein the upper depression is configured with U-shaped from a front side, and the lower depression is configured with reverse U-shaped from the front side, the housing has a mating tongue portion disposed between the upper and the lower depression in an upper-to-lower direction.

9. The cable assembly as recited in claim 7, wherein the housing has a plurality of positioning slots backwardly extending from the upper and the lower depressions, the optical modules include positioning posts backwardly received in the positioning slots, each of the upper and the lower caps has a planar body covers the optical module, and a cylindrical shaped first retainers sandwiched between the positioning post and an inner wall of the positioning slot.

10. The cable assembly as recited in claim 7, further comprising a metallic shell, and a pair of latching members attached to the housing and located at two lateral sides of the optical modules, the shell has a frame surrounding around the mating portion and the upper and the lower caps, each of the pair of latching members has a latching arm delectable in an upper-to-lower direction, a tab protruding upwardly to abut against with a deformable button, and a hook protruding upwardly beyond the shell for locking with the corresponding connector and disposed at a front of the tab.

11. A cable connector assembly comprising:
a housing defining a pair of opposite receiving cavities spaced, via a partition wall, from each other in a transverse direction perpendicular to a lengthwise direction wherein a dimension of the housing in the transverse direction is much shorter than that in the lengthwise direction;
a pair of optical modules disposed in the corresponding receiving cavities, respectively and independently back and forth moveable therein along a front-to-back direction perpendicular to both said transverse direction and said lengthwise direction;
two sets of grooves formed in the housing and spaced from each other in a transverse direction to receive two sets of optical fibers which optically couple to the corresponding optical modules, respectively; and
an external cover encloses the housing and said two sets of optical fibers; wherein
a front end of each optical module is forwardly exposed to an exterior in said front-to-back direction.

12. The cable connector assembly as claimed in claim 11, wherein said two sets of optical fibers are integrated in a cable extending rearwardly from a rear end of the cover.

13. The cable connector assembly as claimed in claim 11, further including a metallic shell enclosing a front portion of the housing to shield the pair of receiving cavity and the corresponding optical modules therein in the transverse direction.

14. The cable connector assembly as claimed in claim 13, wherein said shell defines a pair of chamfer like structures on around opposite two ends of the shell in said lengthwise direction.

15. The cable connector assembly as claimed in claim 13, further including a pair of caps each retained to the housing and sandwiched between the shell and the corresponding optical module to hold the corresponding optical module in position.

16. The cable connector assembly as claimed in claim 13, further including a pair of metallic shells commonly sandwiching the housing therebetween, and respectively sandwiched between the housing and the cover.

* * * * *